(12) United States Patent
Shibata (10) Patent No.: US 10,359,177 B2
(45) Date of Patent: Jul. 23, 2019

(54) ILLUMINATION DEVICE

(71) Applicant: Koito Manufacturing Co., Ltd., Tokyo (JP)

(72) Inventor: Hiroki Shibata, Shizuoka (JP)

(73) Assignee: Koito Manufacturing Co., Ltd., Tokyo (JP)

( * ) Notice: Subject to any disclaimer, the term of this patent is extended or adjusted under 35 U.S.C. 154(b) by 0 days.

(21) Appl. No.: 15/171,214

(22) Filed: Jun. 2, 2016

(65) Prior Publication Data

US 2016/0363282 A1    Dec. 15, 2016

(30) Foreign Application Priority Data

Jun. 10, 2015    (JP) .................................. 2015-117728

(51) Int. Cl.
| | | |
|---|---|---|
| *F21V 15/01* | (2006.01) | |
| *B60Q 1/20* | (2006.01) | |
| *B60Q 1/068* | (2006.01) | |
| *F21V 23/00* | (2015.01) | |
| *F21S 41/143* | (2018.01) | |
| *F21S 41/29* | (2018.01) | |
| *F21S 41/255* | (2018.01) | |
| *F21S 41/33* | (2018.01) | |
| *F21S 45/00* | (2018.01) | |
| *F21S 45/48* | (2018.01) | |
| *F21S 45/47* | (2018.01) | |

(52) U.S. Cl.
CPC ............ *F21V 15/01* (2013.01); *B60Q 1/0683* (2013.01); *B60Q 1/20* (2013.01); *F21S 41/143* (2018.01); *F21S 41/255* (2018.01); *F21S 41/295* (2018.01); *F21S 41/336* (2018.01); *F21S 45/00* (2018.01); *F21S 45/48* (2018.01); *F21V 23/003* (2013.01); *F21S 45/47* (2018.01)

(58) Field of Classification Search
USPC ......................................................... 362/512
See application file for complete search history.

(56) References Cited

U.S. PATENT DOCUMENTS

| | | | |
|---|---|---|---|
| 2012/0201042 A1* | 8/2012 | Shibata ................ | B60Q 1/0683 362/538 |
| 2015/0085511 A1* | 3/2015 | Shibata ................ | B60Q 1/0683 362/512 |

FOREIGN PATENT DOCUMENTS

WO    2014-012878 A    1/2014

* cited by examiner

*Primary Examiner* — Rafferty D Kelly
(74) *Attorney, Agent, or Firm* — Abelman, Frayne & Schwab (57) ABSTRACT

Provided is an illumination device mounted in a vehicle. The illumination device includes: a light source; a projection lens unit having a projection lens; a support member that supports the projection lens; a shaft portion including a pivot axis that extends in a direction intersecting with an optical axis; a shaft holding portion that holds the shaft portion to be pivotable around the pivot axis; a screw member provided to be rotatable around a rotation axis that extends in a direction different from the optical axis; and a conversion mechanism that converts a rotating motion of the screw member around the rotation axis into a pivoting motion of the shaft portion around the pivot axis. The screw member and the conversion mechanism are positioned farther away from the optical axis than the shaft portion and the shaft holding portion in the direction intersecting with the optical axis.

11 Claims, 11 Drawing Sheets

ILLUMINATION DEVICE

CROSS-REFERENCE TO RELATED APPLICATIONS

This application is based on and claims priority from Japanese Patent Application No. 2015-117728, filed on Jun. 10, 2015, with the Japan Patent Office, the disclosure of which is incorporated herein in its entirety by reference.

TECHNICAL FIELD

The disclosure relates to an illumination device mounted in a vehicle.

BACKGROUND

As an example of this kind of illumination devices, a fog lamp is known which accommodates a light source and a projection lens in a lamp chamber defined by a housing and a translucent cover. When light emitted from the light source passes through the projection lens, the light is subject to a predetermined light distribution control so as to form a predetermined light distribution pattern in front of the vehicle (see, e.g., International Publication No. WO 2014/012878 A1).

SUMMARY

In the case of the configuration in which the projection lens is provided in the lamp chamber, an error from a predetermined specification may occur at a reference position of an optical axis of the projection lens due to an error occurring when assembling a product or a variation in vehicle assembling accuracy. In this case, a desired light pattern may not be obtained. Thus, there is a need for provision of an adjustment mechanism for solving the error. Meanwhile, for such illumination devices, there is an increasing demand for reducing the dimension of the direction along the optical axis of the projection lens (a so-called thickness dimension).

An object of the present disclosure is to reduce (thin) the thickness dimension of the illumination device even though the illuminating device is provided with an adjustment mechanism that adjusts the projection lens and the optical axis thereof.

In order to achieve the object, according to an aspect of the present disclosure, an illumination device mounted in a vehicle includes: a light source; a projection lens unit having a projection lens configured to allow at least some of light emitted from the light source to pass therethrough; a support member configured to support the projection lens; a shaft portion provided in one of the projection lens unit and the support member, and including a pivot axis that extends in a direction intersecting with an optical axis of the projection lens; a shaft holding portion provided in the other of the projection lens unit and the support member, and configured to hold the shaft portion to be pivotable around the pivot axis of the projection lens; a screw member provided to be rotatable around a rotation axis that extends in a direction different from the optical axis; and a conversion mechanism configured to convert a rotating motion of the screw member around the rotation axis into a pivoting motion of the shaft portion around the pivot axis. The screw member and the conversion mechanism are positioned farther away from the optical axis than the shaft portion and the shaft holding portion in the direction intersecting with the optical axis.

Since the rotation axis of the screw member extends in a direction different from the optical axis of the projection lens, the dimension of the illumination device in the direction along the optical axis of the projection lens may be considerably reduced, as compared with the conventional general configuration in which the rotation axis of the screw member extends along the optical axis of the projection lens.

Further, the screw member and the conversion mechanism are positioned farther away from the optical axis than the shaft and the shaft holding portion in the direction intersecting with the optical axis. Since the screw member and the conversion mechanism do not overlap with components that enable the pivot of the projection lens unit, in the optical axis extending direction, the dimension of the illumination device in the optical axis extending direction may further reduced.

The illumination device may be configured as follows. The conversion mechanism includes: a transmission member screwed with the screw member to convert the rotating motion of the screw member around the rotation axis to a linear motion; a cam surface provided in one of the transmission member and the projection lens unit; and a cam follower provided in the other of the transmission member and the projection lens unit, and configured to convert the linear motion to the pivoting motion of the shaft portion around the pivot axis by sliding on the cam surface.

According to the above configuration, the point of action of the cam mechanism is easily brought close to the pivot center of the projection lens unit in the direction along the optical axis. Thus, the conversion of the motion may be efficiently performed, and an increase in the size of the illumination device in the direction along the optical axis may be suppressed. Further, depending on the configuration of the cam mechanism, the degree of freedom in selecting a direction where the rotation axis of the screw member extends, increases. Therefore, the degree of freedom in design for reducing the dimension of the illumination device in the direction where the optical axis of the projection lens, increases.

The illumination device may be configured as follows. The illumination device further includes a controller configured to control an operation of the light source. The conversion mechanism is disposed between the shaft portion and the controller in the direction intersecting with the optical axis.

According to the above configuration, it is possible to utilize a space in the direction intersecting with the optical axis with a relatively high degree of freedom in layout, while suppressing the dimension in the direction where the optical axis of the projection lens extends.

The illumination device may be configured as follows. The illumination device further includes a housing defining a part of a lamp chamber that accommodates the light source, the support member, the shaft portion, the shaft holding portion, the conversion mechanism, and a part of the screw member, and including a light transmitting unit configured to allow the light, which has passed through the projection lens, to pass therethrough; and a connector disposed at a side where the light transmitting unit is provided in the housing, and configured to supply a power to the controller.

In order to secure a passage of the light that has passed through the light transmitting unit, a space with a certain area is required at a side where the light transmitting unit is provided in the periphery of the illumination device. According to the above configuration, the connector is disposed in the space to supply a power to the controller.

Therefore, the utilization efficiency of the peripheral space of the illumination device may be enhanced.

The illumination device may be configured as follows. The illumination device further includes a housing defining a part of a lamp chamber that accommodates the light source, the support member, the shaft portion, the shaft holding portion, the conversion mechanism, and a part of the screw member, and including a light transmitting unit configured to allow the light passing through the projection lens to pass therethrough. The housing further includes a protrusion that protrudes outward at a side where the light transmitting unit is provided in the housing. The screw member is held in the housing such that the rotation axis passes through the protrusion.

In order to secure a passage of the light that has passed through the light transmitting unit, a space with a certain area is required at a side where the light transmitting unit is provided in the periphery of the illumination device. According to the above configuration, the screw member is disposed in the space to adjust the reference position of the optical axis of the projection lens. Therefore, the utilization efficiency of the peripheral space of the illumination device may be enhanced.

The illumination device may be configured as follows. The illumination device further includes a housing defining a part of a lamp chamber that accommodates the light source, the support member, the shaft portion, the shaft holding portion, the conversion mechanism, and a part of the screw member, and including a light transmitting unit configured to allow the light passing through the projection lens to pass therethrough; and a ventilation unit disposed at a side where the light transmitting unit is provided in the housing, and provided in communication with the lamp chamber.

In order to secure a passage of the light that has passed through the light transmitting unit, a space with a certain area is required at a side where the light transmitting unit is provided in the periphery of the illumination device. According to the above configuration, the ventilation unit in communication with the lamp chamber is disposed in the space. Therefore, the utilization efficiency of the peripheral space of the illumination device may be enhanced.

The foregoing summary is illustrative only and is not intended to be in any way limiting. In addition to the illustrative aspects, embodiments, and features described above, further aspects, embodiments, and features will become apparent by reference to the drawings and the following detailed description.

DETAILED DESCRIPTION

In the following detailed descriptions, reference is made to the accompanying drawings which form a part of the present disclosure. The illustrative embodiments described in the detailed descriptions, drawings, and claims do not intend to limit. Other embodiments may be utilized and other modified examples may be made without departing from the spirit or scope of the subject matter presented in the disclosure.

Hereinafter, an exemplary embodiment of the present disclosure will be described in detail with reference to accompanying drawings. In the respective drawings used in the following description, a scale is suitably changed in order to illustrate each element in a recognizable size. The terms, "right side" and "left side" used in the following description indicate left and right directions viewed from the driver's seat.

Figure 1:
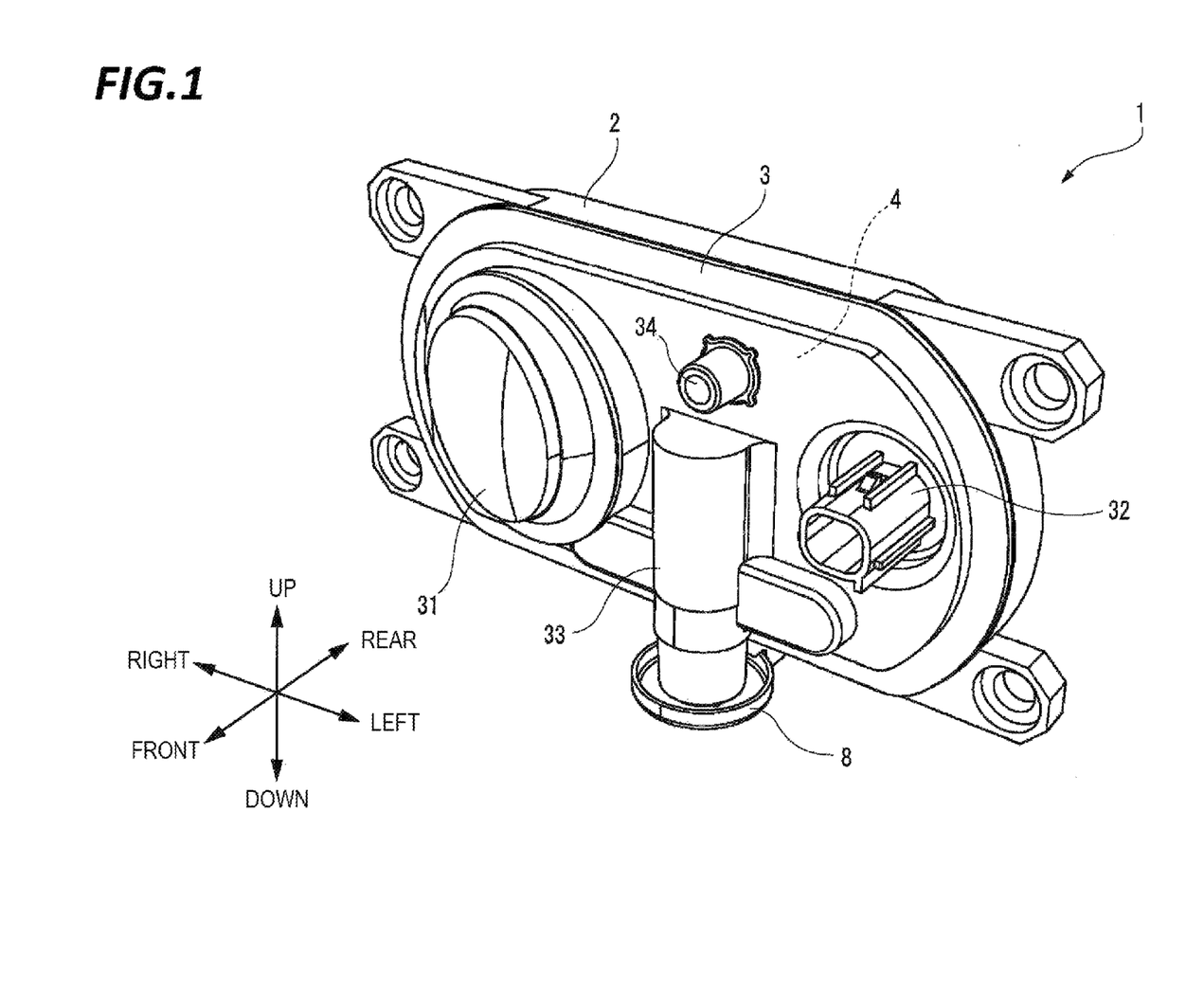
FIG. 1 is a perspective view illustrating an appearance of a fog lamp according to an exemplary embodiment.
Figure 2:
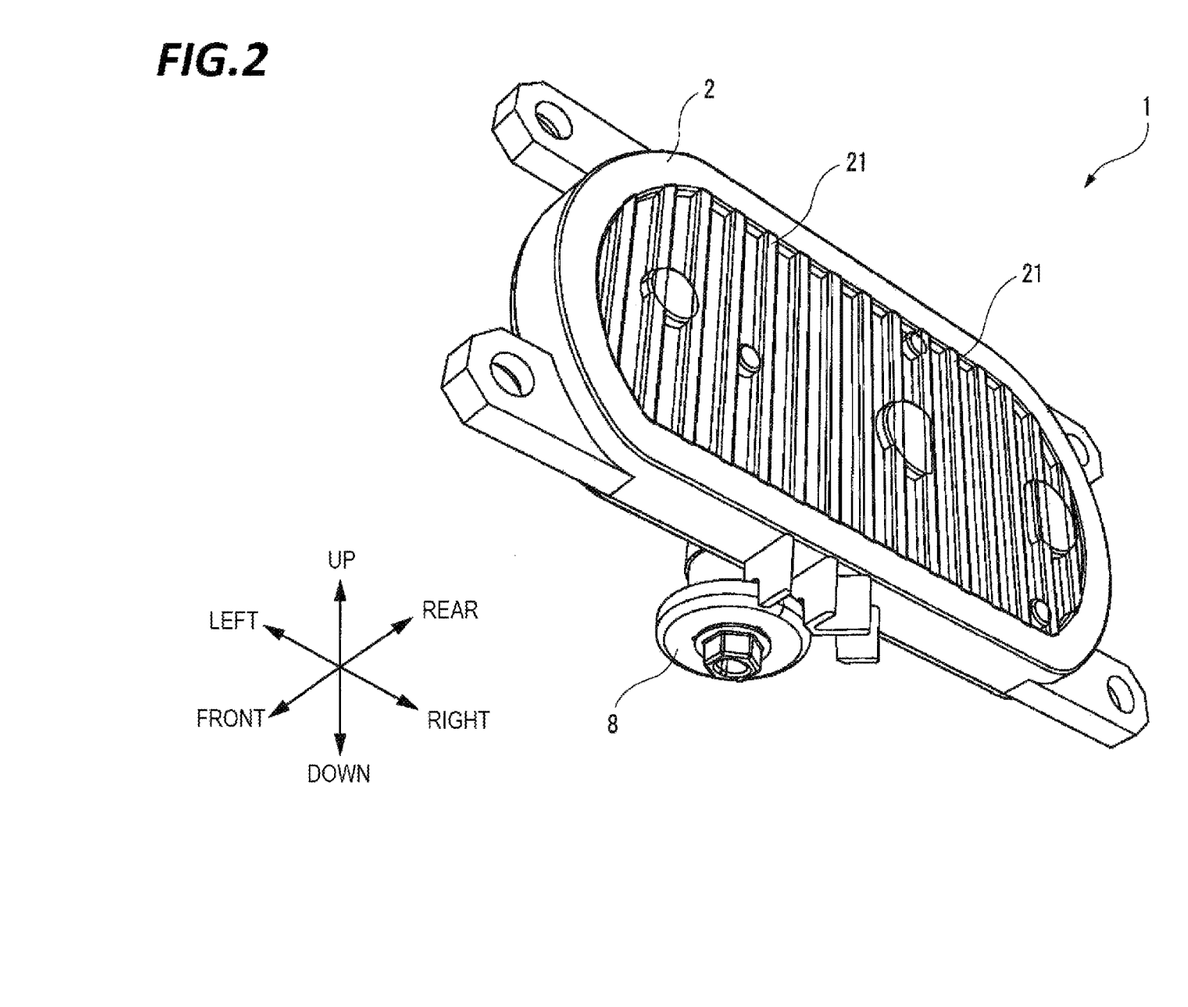
FIG. 2 is a perspective view illustrating the appearance of the fog lamp of FIG. 1.

FIG. 1 is a perspective view illustrating an appearance of a fog lamp 1 (an exemplary illumination device) according to an exemplary embodiment when viewed from the left front upper side. FIG. 2 is a perspective view illustrating the appearance of the fog lamp 1 when viewed from the left rear lower side.

The fog lamp 1 includes a heat sink 2 and a cover housing 3. The cover housing 3 is mounted on the heat sink 2 to define a lamp chamber 4 therebetween. The cover housing 3 includes a light transmitting cover 31.

As illustrated in FIG. 2, the heat sink 2 includes a plurality of heat radiation plates 21 on the rear surface thereof. The plurality of heat radiation plates 21 extend in the vertical direction and are arranged in the horizontal direction. That is, the plurality of heat radiation 21 are disposed outside the lamp chamber 4. The heat sink 2 is made of a material having high thermal conductivity such as, for example, a metal.

Figure 3:
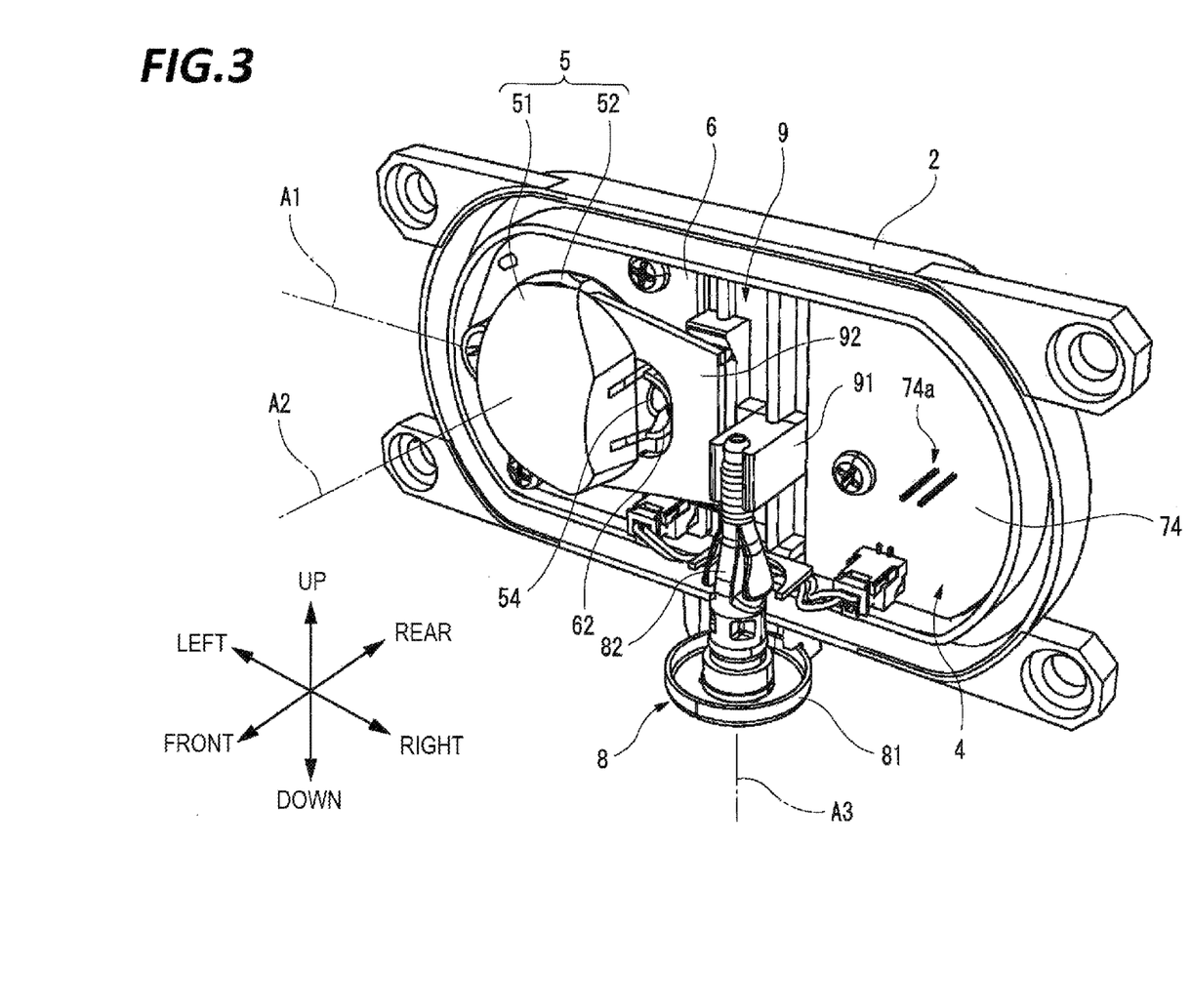
FIG. 3 is a perspective view illustrating a part of the fog lamp of FIG. 1.

FIG. 3 is a perspective view illustrating a part of the fog lamp 1 in which the cover housing 3 is removed from the state illustrated in FIG. 1, when viewed from the left front upper side. A projection lens unit 5 is accommodated in the lamp chamber 4. The projection lens unit 5 includes a projection lens 51 and a lens holder 52.

Figure 4:
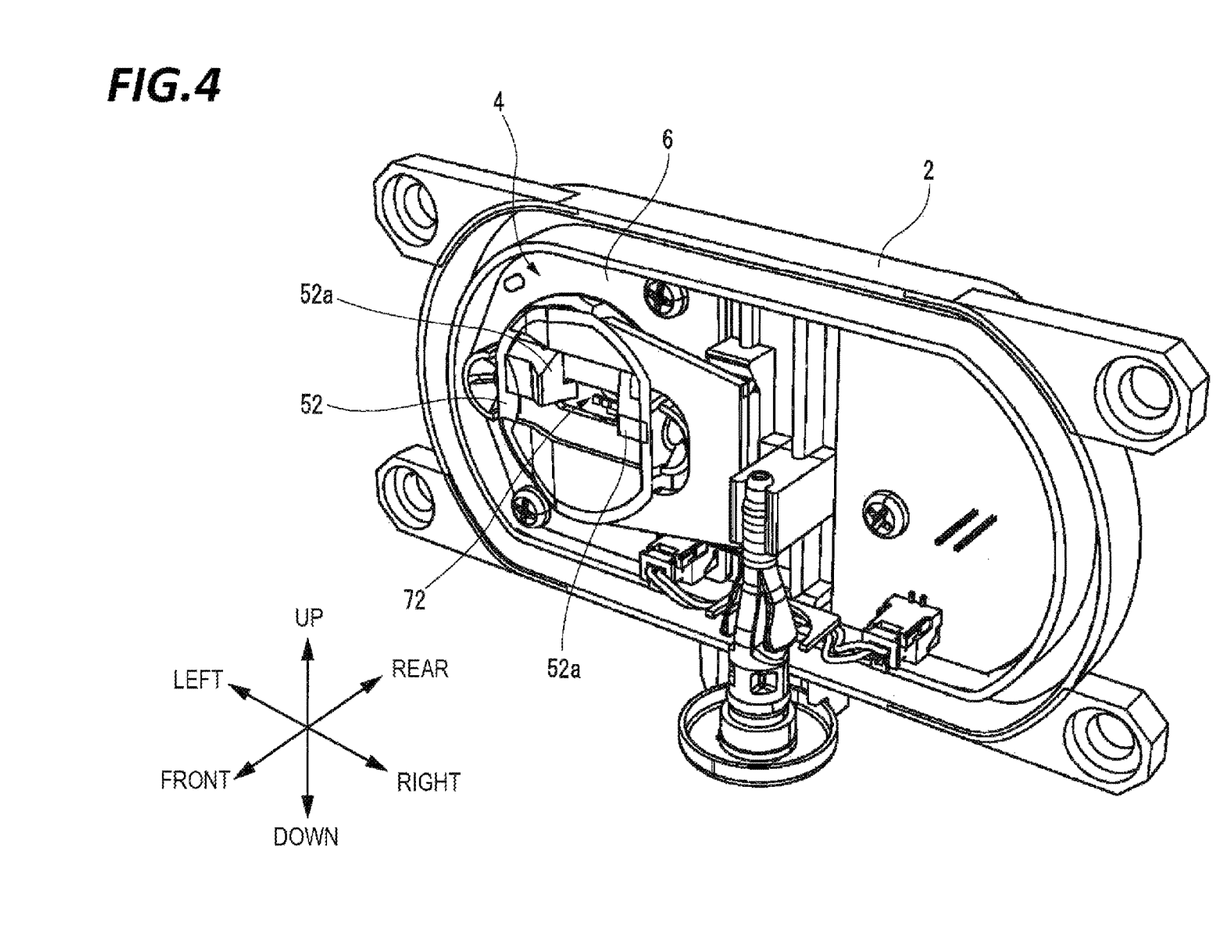
FIG. 4 is a perspective view illustrating a part of the fog lamp of FIG. 1.
Figure 5:
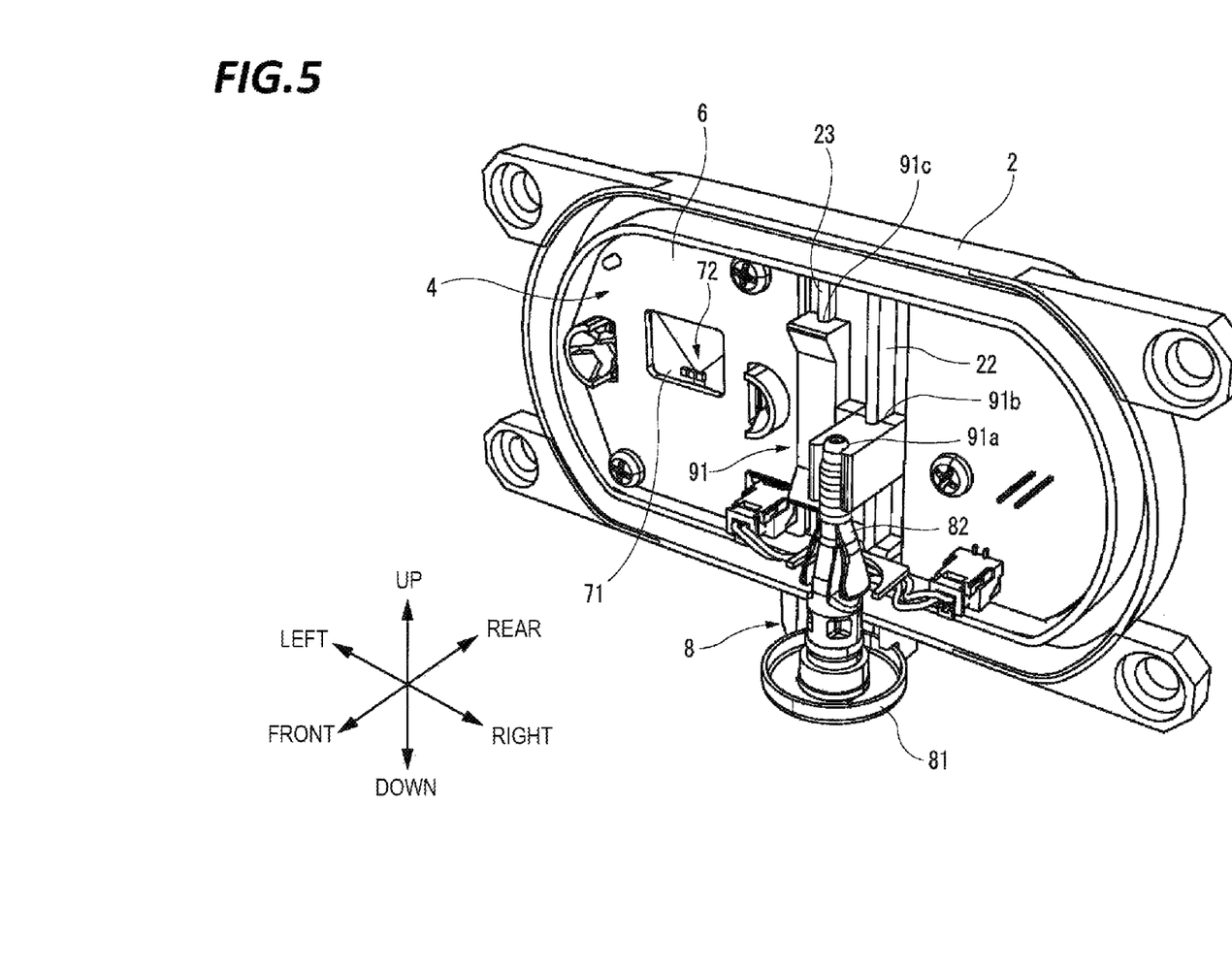
FIG. 5 is a perspective view illustrating a part of the fog lamp of FIG. 1.

FIG. 4 is a perspective view illustrating a part of the fog lamp 1 in which the projection lens 51 is removed from the state illustrated in FIG. 3, when viewed from the left front upper side. FIG. 5 is a perspective view illustrating a part of the fog lamp 1 in which the lens holder 52 is removed from the state illustrated in FIG. 4 when viewed from the left front upper side. A support member 6 is accommodated in the lamp chamber 4.

Figure 6:
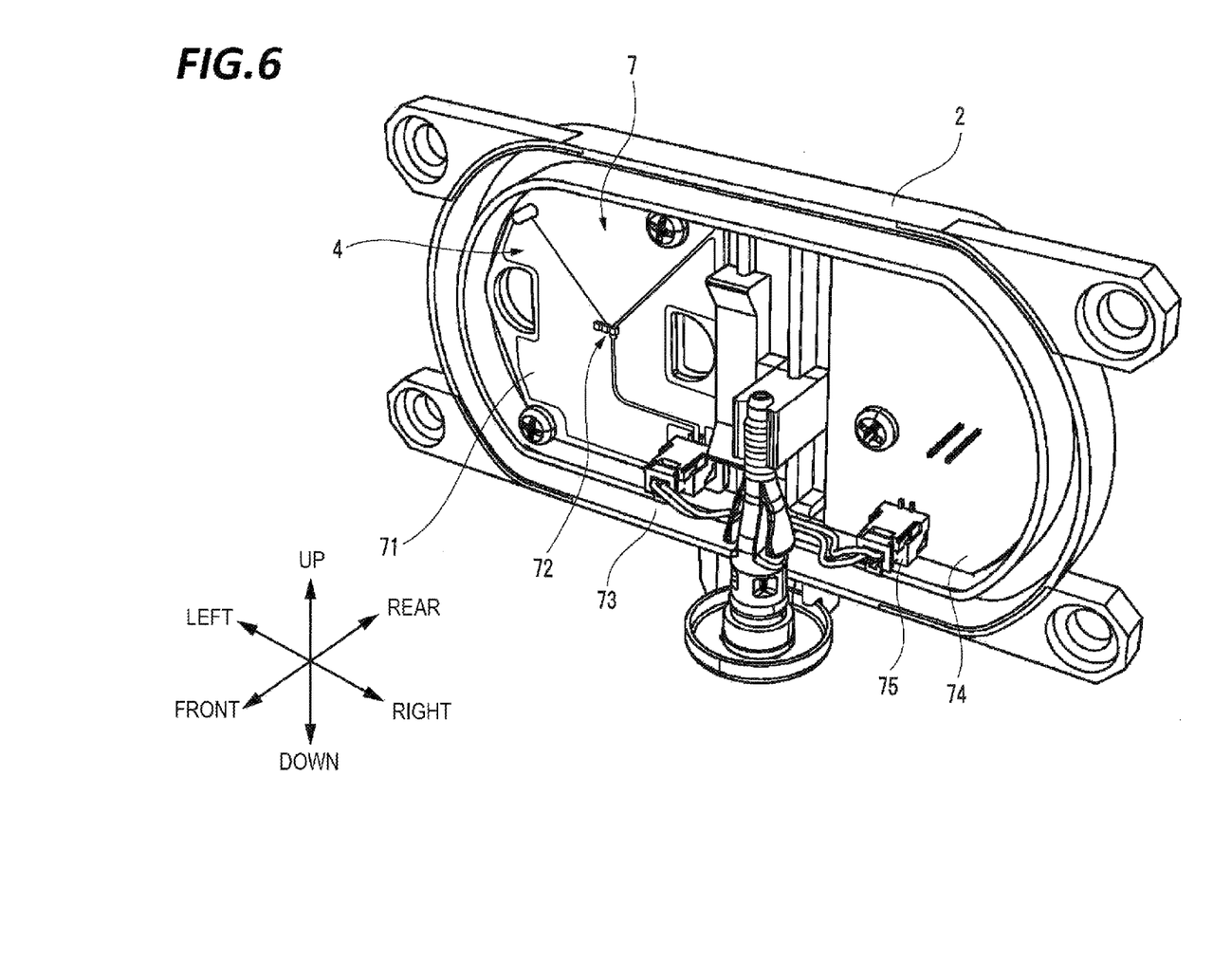
FIG. 6 is a perspective view illustrating a part of the fog lamp of FIG. 1.

FIG. 6 is a perspective view illustrating a part of the fog lamp 1 in which the support member 6 is removed from the state illustrated in FIG. 5, when viewed from the left front upper side. A light source unit 7 is accommodated in the lamp chamber 4. The light source unit 7 includes a support substrate 71, a light source 72, and a first connector 73. The support substrate 71 is fixed to the heat sink 2. The light source 72 and the first connector 73 are disposed on the front surface of the support substrate 71. The support substrate 71 includes a circuit wiring, which electrically interconnects the light source 72 and the first connector 73.

In the present exemplary embodiment, the light source 72 is constituted by a plurality of semiconductor light emitting elements. Examples of the semiconductor light emitting elements include light emitting diodes, laser diodes, and organic EL elements. The number of light emitting elements is determined appropriately depending on the specification. Further, a lamp light source (e.g., a discharge lamp or a halogen bulb) may be used as the light source 72.

The light source unit 7 further includes a controller 74 and a second connector 75. The controller 74 includes a light source control circuit that controls a turn-on/off of the light source 72. The second connector 75 is electrically connected to the circuit. The controller 74 is fixed to the heat sink 2.

As illustrated in FIG. 5, the support member 6 is fixed to the front surface of the support substrate 71 of the light source unit 7. As illustrated in FIG. 4, the support member 6 supports the lens holder 52. As illustrated in FIG. 3, the lens holder 52 supports the projection lens 51. It may also be said that the support member 6 supports the projection lens unit 5.

As illustrated in FIG. 4, the lens holder 52 includes a pair of reflectors 52a. The pair of reflectors 52a is shaped and arranged so as to reflect the light emitted from the light source 72 of the light source unit 7, toward the projection lens 51. At least a part of the light reflected from each reflector 52a passes through the projection lens 51. The light, which has passed through the projection lens 51, passes through the light transmitting cover 31 of the cover housing 3, and illuminates the front side of the fog lamp 1.

Figure 7:
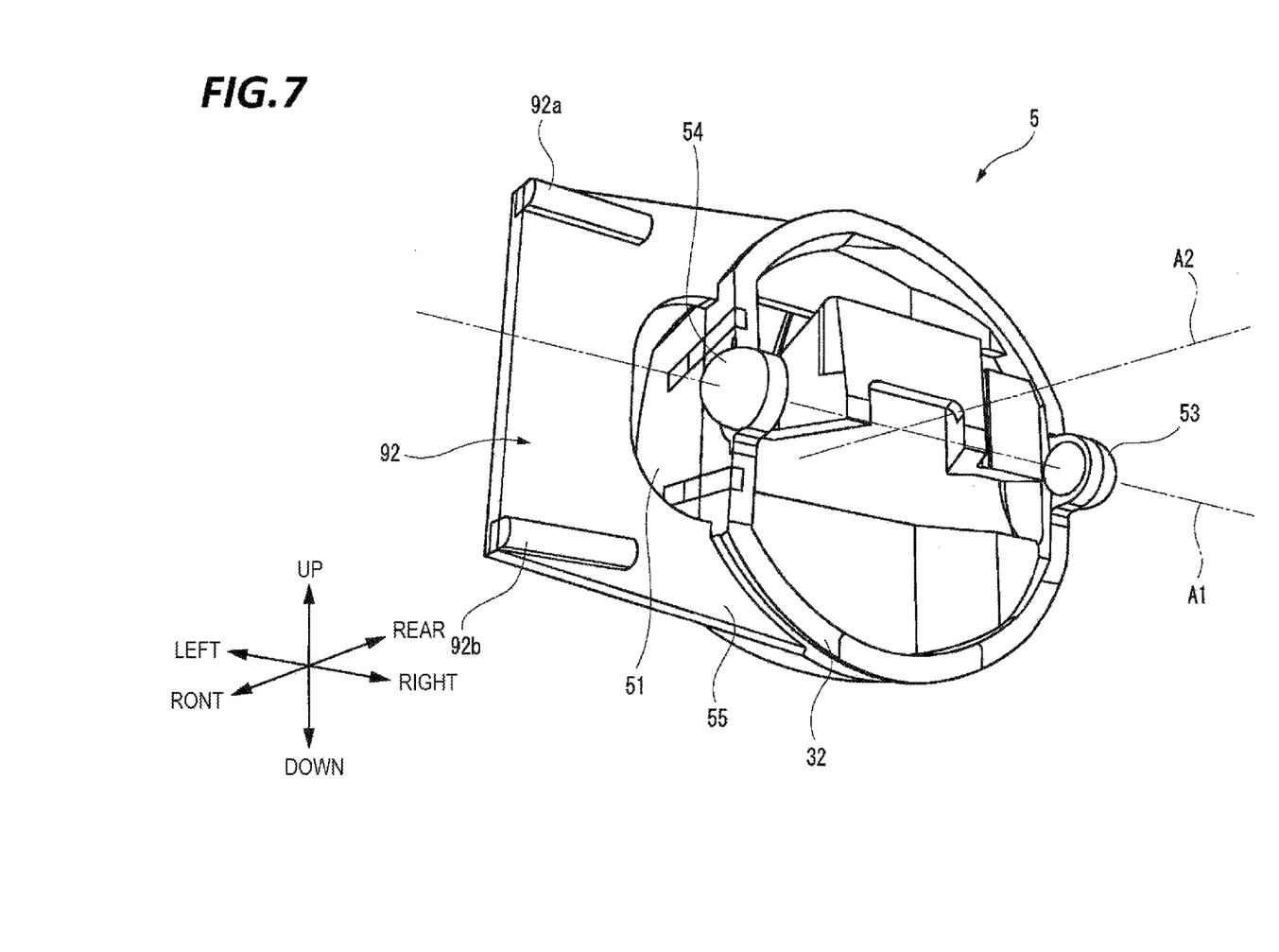
FIG. 7 is a perspective view illustrating a projection lens provided in the fog lamp of FIG. 1.
Figure 8:
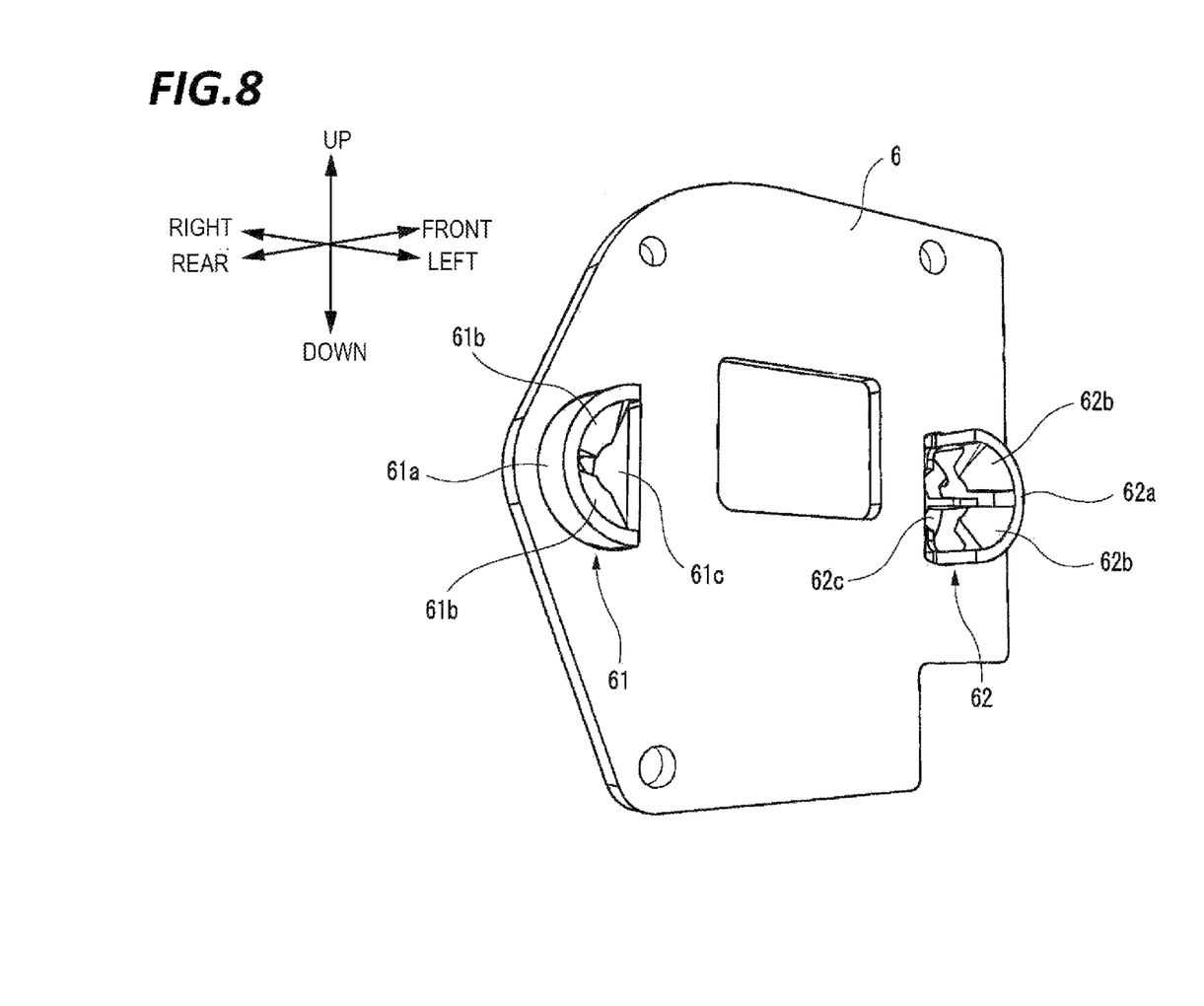
FIG. 8 is a perspective view illustrating a support member provided in the fog lamp of FIG. 1.

Next, descriptions will be made on a configuration in which the projection lens unit 5 is supported by the support member 6, with reference to FIGS. 7 and 8. FIG. 7 is a perspective view illustrating the appearance of the projection lens unit 5 when viewed from the left rear lower side. FIG. 8 is a perspective view illustrating the appearance of the support member 6 when viewed from the right front lower side.

As illustrated in FIG. 7, the projection lens 51 is fixed to the front portion of the lens holder 52. That is, the position of the projection lens 51 relative to the lens holder 52 is not changed. The projection lens unit 5 includes a right shaft portion 53 and a left shaft portion 54. The right shaft portion 53 is disposed in the right side portion of the lens holder 52. The right shaft portion 53 is formed in a hemispherical shape of which the spherical surface is directed to the right side. The left shaft portion 54 is disposed in the left side portion of the lens holder 52. The left shaft portion 54 is formed in a hemispherical shape of which the spherical surface is directed to the left side. An axis A1, which connects the centers of the right shaft portion 53 and the left shaft portion 54, extends in a direction orthogonal to an optical axis A2 of the projection lens 51. That is, the right shaft portion 53 and the left shaft portion 54 extend in a direction intersecting with the optical axis A2 of the projection lens 51.

As illustrated in FIG. 8, the support member 6 includes a right shaft holding portion 61 and a left shaft holding portion 62. The right shaft holding portion 61 and the left shaft holding portion 62 are provided on the front surface of the support member 6.

The right shaft holding portion 61 includes a peripheral wall 61a, a pair of protrusions 61b, and a curved receiving surface 61c. The peripheral wall 61a protrudes forward from the front surface of the support member 6, and extends in a semicircular arc shape. The semicircular arc is opened to the left side. Each of the pair of protrusions 61b extends to overhang from the front end portion of the peripheral wall 61a toward the inner side of the semicircular arc. Each of the pair of protrusions 61b is flexurally deformable backward to some extent. The curved receiving surface 61c is disposed at the inner side of the semicircular arc drawn by the peripheral wall 61a, and faces the pair of protrusions 61b. The curved receiving surface 61c has a shape along the hemispherical surface of the right shaft portion 53.

The left shaft holding portion 62 includes a peripheral wall 62a, a pair of protrusions 62b, and a curved receiving surface 62c. The peripheral wall 62a protrudes forward from the front surface of the support member 6, and extends in a semicircular arc shape. The semicircular arc is opened to the right side. Each of the pair of protrusions 62b extends to overhang from the front end portion of the peripheral wall 62a toward the inner side of the semicircular arc. Each of the pair of protrusions 62b is flexurally deformable backward to some extent. The curved receiving surface 62c is disposed at the inner side of the semicircular arc drawn by the peripheral wall 62a, and faces the pair of protrusions 62b. The curved receiving surface 62c has a shape along the hemispherical surface of the left shaft portion 54.

The lens holder 52 and the support member 6 configured as described above are coupled as illustrated in FIG. 4. At this time, the right shaft portion 53 and the left shaft portion 54 are held in the right shaft holding portion 61 and the left shaft holding portion 62 of the support member 6, respectively.

Specifically, as the right shaft portion 53 is pressed against the right shaft holding portion 61, the right shaft portion 53 enters a region surrounded by the peripheral wall 61a while deforming the pair of protrusions 61b backward. When a part of the hemispherical surface of the right shaft portion 53 comes in contact with the curved receiving surface 61c, the pair of protrusions 61b returns to the original position thereof, and suppresses the right shaft portion 53 from falling out forward. Therefore, in the region surrounded by the peripheral wall 61a, the right shaft portion 53 is pivotable in a plane orthogonal to the axis A1 illustrated in FIG. 7.

Similarly, as the left shaft portion 54 is pressed against the left shaft holding portion 62, the let shaft portion 54 enters a region surrounded by the peripheral wall 62a while deforming the pair of protrusions 62b backward. When a part of the hemispherical surface of the left shaft portion 54 comes in contact with the curved receiving surface 62c, the pair of protrusions 62b returns to the original position thereof, and suppresses the left shaft portion 54 from falling out forward. Therefore, in the region surrounded by the peripheral wall 62a, the left shaft portion 54 is pivotable in a plane orthogonal to the axis A1 illustrated in FIG. 7.

That is, the right shaft holding portion 61 and the left shaft holding portion 62 hold the right shaft portion 53 and the left shaft portion 54, respectively, to allow the pivot of the projection lens unit 5 around the axis A1 as a pivot axis.

As illustrated in FIGS. 1 and 2, the fog lamp 1 includes a screw member 8. As illustrated in FIG. 3, the screw member 8 includes a head portion 81 and a shaft portion 82. The screw member 8 is rotatable around a rotation axis A3 that extends along the shaft portion 82. The rotation axis A3 extends in a direction different from the optical axis A2 of the projection lens 51. The head portion 81 is disposed outside the cover housing 3 (outside the lamp chamber 4). The head portion 81 is configured to operate the rotation by a predetermined tool. The shaft portion 82 penetrates the cover housing 3 and extends into the lamp chamber 4. A threaded recess is formed on the outer peripheral surface of the shaft portion 82.

As illustrated in FIG. 3, a conversion mechanism 9 is accommodated in the lamp chamber 4. The conversion mechanism 9 is configured to convert the rotating motion of the screw member 8 around the rotation axis A3 into the pivoting motion of the right shaft portion 53 and the left shaft portion 54 of the projection lens unit 5 around the axis A1 (the pivot axis). Specifically, the conversion mechanism 9 includes a transmission member 91 and a cam follower 92.

Figure 9A:
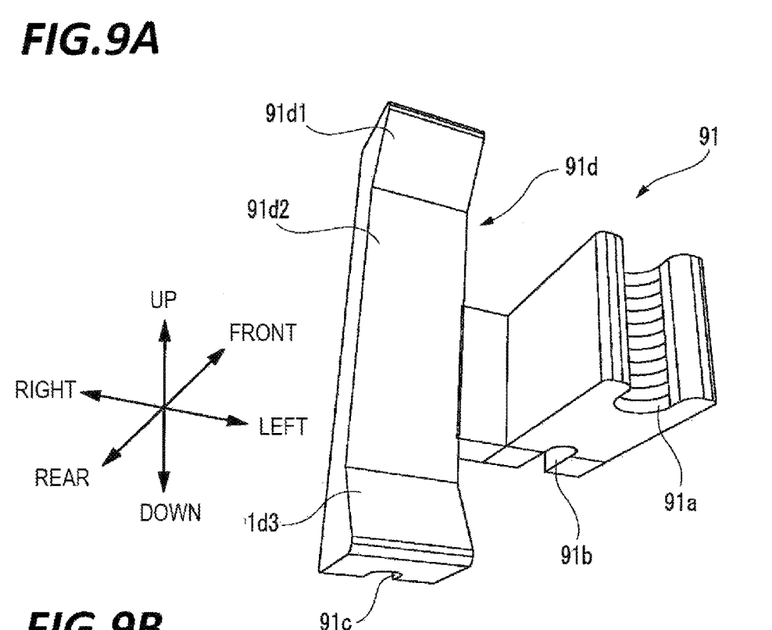
FIGS. 9A and 9B are perspective views illustrating a transmission member provided in the fog lamp of FIG. 1.
Figure 9B:
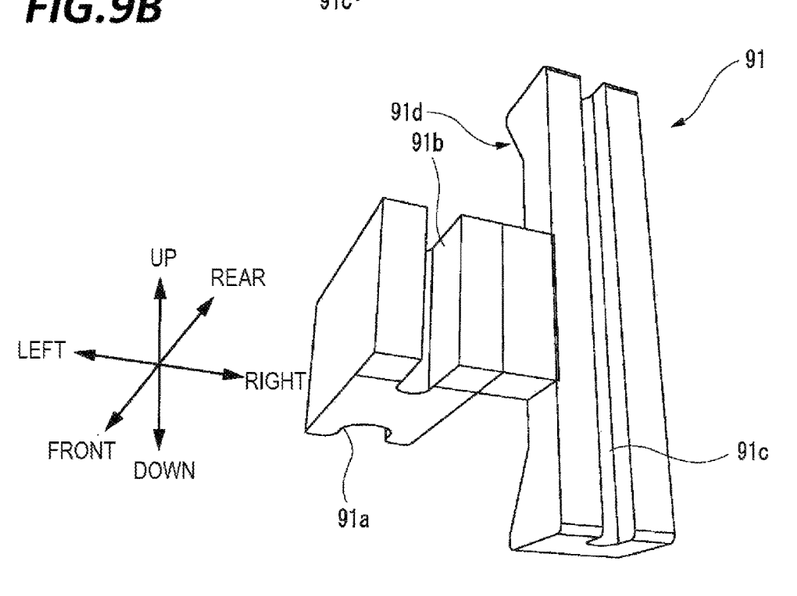

FIG. 9A is a perspective view illustrating the appearance of the transmission member 91 when viewed from the right front lower side. FIG. 9B is a perspective view illustrating the appearance of the transmission member 91 when viewed from the left rear lower side. The transmission member 91 includes a screw receiving groove 91a, a first guide groove 91b, a second guide groove 91c, and a cam surface 91d.

The screw receiving groove 91a is opened to the front side, and extends linearly in the vertical direction. A threaded recess is formed on the inner wall of the screw receiving groove 91a. The screw receiving groove 91a is configured to be screwed with the shaft portion 82 of the screw member 8 via the threaded recess thereof.

The first guide groove 91b is formed at the rear side of the screw receiving groove 91a. The first guide groove 91b is opened to the rear side, and extends linearly in the vertical direction.

The second guide groove 91c is formed at the right side of the first guide groove 91b. The second guide groove 91c is opened to the rear side, and extends linearly in the vertical direction. The first guide groove 91b and the second guide groove 91c extend in parallel with each other.

The cam surface 91d is formed at the right side of the screw receiving groove 91a, that is, at the front side of the second guide groove 91c. The cam surface 91d includes an upper inclined portion 91d1, an intermediate portion 91d2, and a lower inclined portion 91d3. The intermediate portion 91d2 extends linearly in the vertical direction. The intermediate portion 91d2 extends in parallel with the second guide groove 91c. The upper inclined portion 91d1 is positioned at the upper side of the intermediate portion 91d2. The lower inclined portion 91d3 is positioned at the lower side of the intermediate portion 91d2. The upper inclined portion 91d1 forms an inclined surface of which the upper end is positioned further forward than the lower end. The lower inclined portion 91d3 forms an inclined surface of which the lower end is positioned further forward than the upper end.

As illustrated in FIG. 7, the projection lens 5 includes an arm portion 55. The arm portion 55 extends leftward from the left side portion of the lens holder 52. The cam follower 92 is provided in the left end portion of the arm portion 55. That is, the cam follower 92 is provided at the left side of the left shaft portion 54. The cam follower 92 includes an upper protrusion 92a and a lower protrusion 92b. The upper protrusion 92a and the lower protrusion 92b protrude backward from the rear surface of the arm portion 55.

As illustrated in FIG. 5, the heat sink 2 includes a first guide rail 22 and a second guide rail 23. The first guide rail 22 and the second guide rail 23 extend linearly in the vertical direction on the front surface of the heat sink 2. The first guide rail 22 and the second guide rail 23 extend in parallel with each other.

The transmission member 91 is mounted on the heat sink 2 in a state where the shaft portion 82 of the screw member 8 is screwed into the screw receiving groove 91a. At this time, the first guide rail 22 is fitted to the first guide groove 91b, and the second guide rail 23 is fitted to the second guide groove 91c. The transmission member 91 is slidable in the vertical direction along the first guide rail 22 and the second guide rail 23.

Figure 10A:
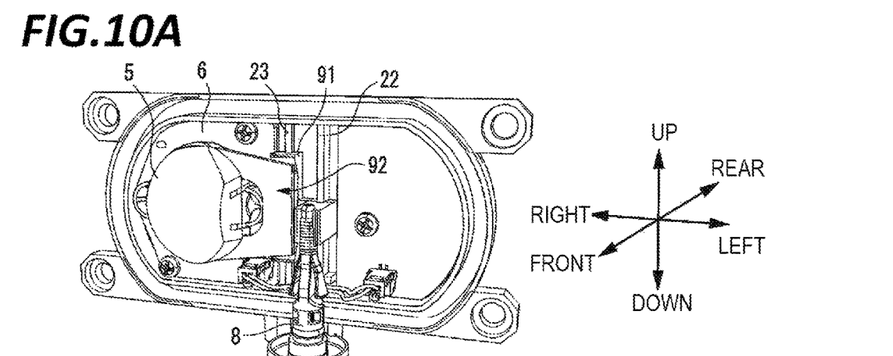
FIGS. 10A to 10C are perspective views illustrating operations of a conversion mechanism provided in the fog lamp of FIG. 1.
Figure 11A:
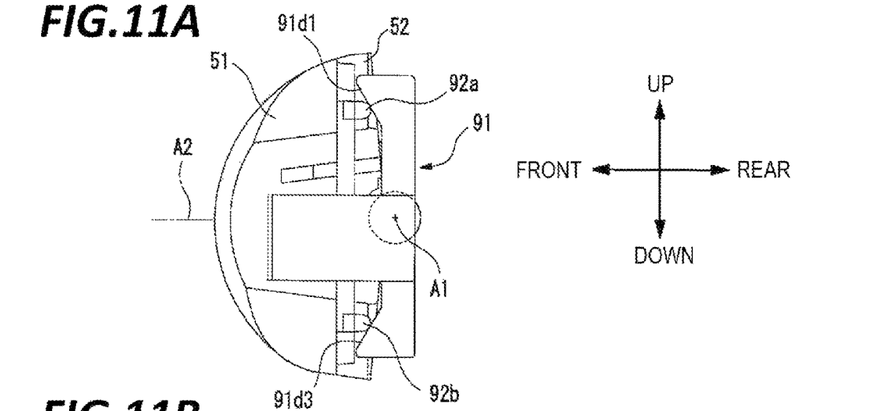
FIGS. 11A to 11C are left side views illustrating the operations of the conversion mechanism provided in the fog lamp of FIG. 1.

From this state, when the projection lens unit 5 is mounted on the support member 6 as illustrated in FIG. 10A, the upper protrusion 92a and the lower protrusion 92b of the cam follower 92 come in contact with the upper inclined portion 91d1 and the lower inclined portion 91d3 on the cam surface of the transmission member 91, respectively, as illustrated in FIG. 11A. In FIG. 11A, illustration of the screw member 8 is omitted. FIGS. 10A and 11A illustrate an initial state of the conversion mechanism 9. Since the right shaft portion 53 and the left shaft portion 54 are held in the right shaft holding portion 61 and the left shaft holding portion 62, respectively, the transmission member 91 is suppressed from falling out from the heat sink 2 through the arm portion 55.

Figure 10B:
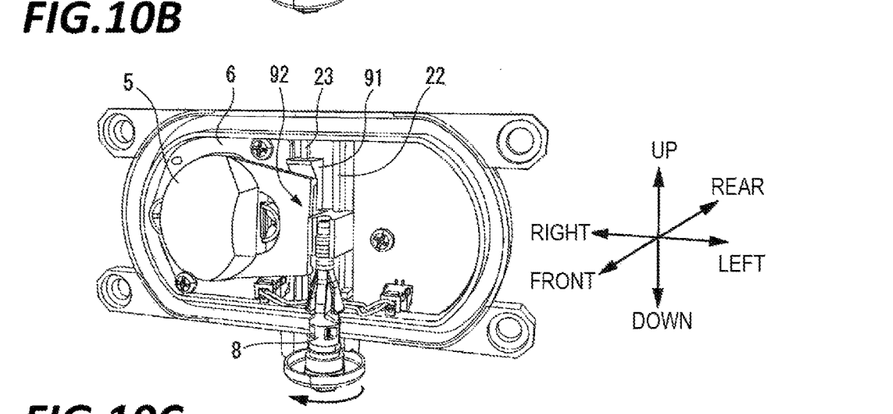
Figure 11B:
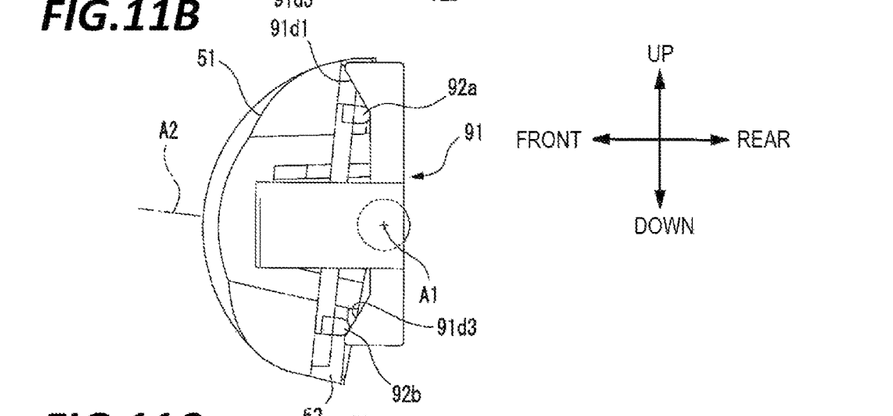

When the screw member 8 is rotated in a counterclockwise direction as viewed from the bottom side, the screwing state between the shaft portion 82 and the screw receiving groove 91a is changed, and the transmission member 91 slides upward along the first guide rail 22 and the second guide rail 23. FIG. 10B illustrates this state. At this time, as illustrated in FIG. 11B, the upper protrusion 92a of the cam follower 92 comes close to the lower end of the upper inclined portion 91d1 on the cam surface 91d, and the lower protrusion 92b of the cam follower 92 comes close to the lower end of the lower inclined portion 91d3 on the cam surface 91d. Therefore, the lens holder 52 pivots around the axis A1 in a clockwise direction as viewed from the left side, so that the optical axis A2 of the projection lens 51 is inclined upward.

Figure 10C:
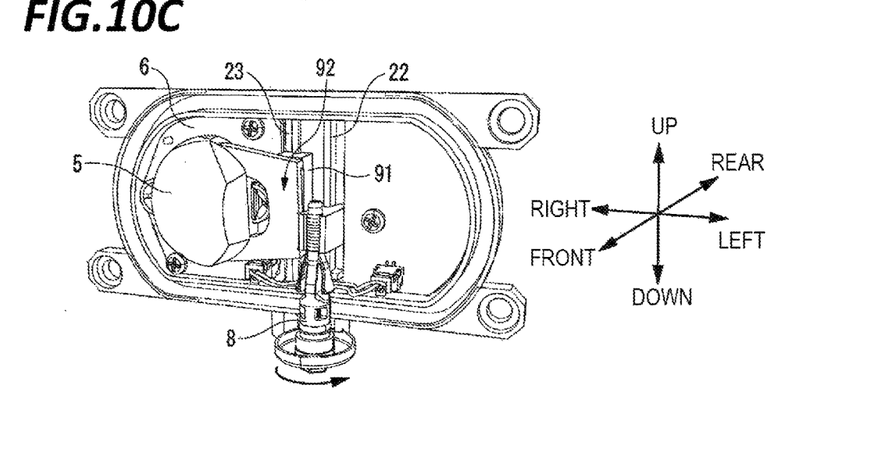
Figure 11C:
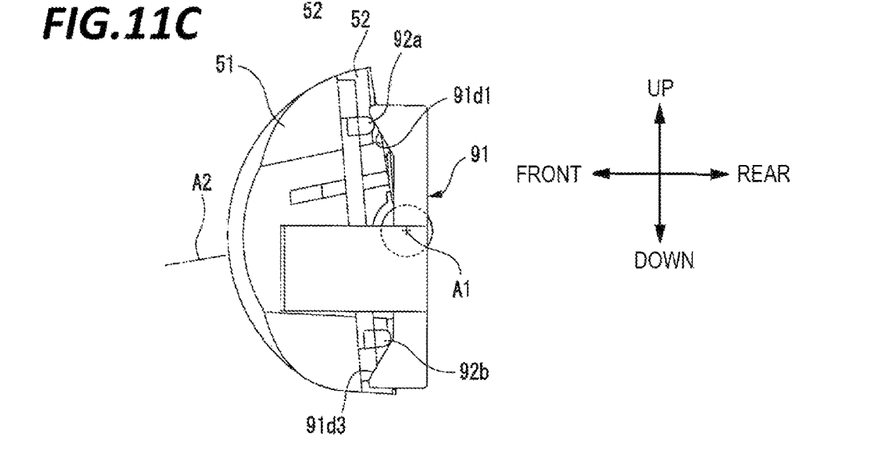

When the screw member 8 is rotated in a clockwise direction as viewed from the bottom side, the screwing state of the shaft portion 82 and the screw receiving groove 91a is changed, and the transmission member 91 slides downward along the first guide rail 22 and the second guide rail 23. FIG. 10C illustrates this state. At this time, as illustrated in FIG. 11C, the upper protrusion 92a of the cam follower 92 comes close to the upper end of the upper inclined portion 91d1 on the cam surface 91d, and the lower protrusion 92b of the cam follower 92 comes close to the upper end of the lower inclined portion 91d3 on the cam surface 91d. Therefore, the lens holder 52 pivots around the axis A1 in a counterclockwise direction as viewed from the left side, so that the optical axis A2 of the projection lens 51 is inclined downward.

That is, the transmission member 91 is screwed with the screw member 8 to convert the rotating motion of the screw member 8 around the rotation axis A3 into the linear motion along the first guide rail 22 and the second guide rail 23. Further, the cam follower 92 slides on the cam surface 91d of the transmission member 91 to convert the linear motion of the transmission member 91 into the pivoting motion of the right shaft portion 53 and the left shaft portion 54 around the axis A1. Therefore, the reference position of the optical axis A2 of the projection lens 51 with respect to the vertical direction may be adjusted by the rotation operation of the screw member 8.

When trying to suppress enlargement of the illumination device having a mechanism for controlling the reference position of the optical axis of the projection lens, especially when trying to pursue thinning thereof, a degree of freedom in layout of the direction intersecting with the optical axis (so-called vertical and horizontal directions) is relatively increased with respect to a degree of freedom in layout of the direction along the optical axis (a so-called longitudinal direction). In the fog lamp 1 according to the present exemplary embodiment, arrangement of components that can positively utilize such a space, is adopted.

Specifically, as illustrated in FIG. 3, the rotation axis A3 of the screw member 8 is configured to extend in a direction different from the optical axis A2 of the projection lens 51. Thus, the dimension of the fog lamp 1 in the direction along the optical axis of the projection lens may be considerably reduced, as compared with the conventional general configuration in which the rotation axis of the screw member extends along the optical axis of the projection lens.

Further, the screw member 8 (more strictly, the rotation axis A3 of the screw member 8) and the conversion mechanism 9 (more strictly, the cam surface 91*d* and the cam follower 92) are disposed at positions farther away from the optical axis A2 than the left shaft portion 54 and the left shaft holding portion 62 in the direction intersecting with the optical axis A2. Since the screw member 8 and the conversion mechanism 9 do not overlap with components that enable the pivot of the projection lens unit 5, in the direction where the optical axis A2 extends, the dimension of the fog lamp 1 in the direction where the optical axis A2 extends may be further reduced.

Further, the conversion mechanism 9, which converts the rotating motion of the screw member 8 around the rotation axis A3 into the pivoting motion of the right shaft portion 53 and the left shaft portion 54 of the projection lens unit 5 around the axis A1 (the pivot axis), is constituted by a cam mechanism including the transmission member 91 and the cam follower 92. The transmission member 91 converts the rotation motion of the screw member 8 around the rotation axis A3 into the linear motion. The transmission member 91 is provided with the cam surface 91*d*, and the cam follower 92 converts the linear motion of the transmission member 91 into the pivot motion of the projection lens unit 5 by sliding on the cam surface 91*d*.

According to the above configuration, the point of action of the cam mechanism is easily brought close to the pivot center (i.e., the pivot axis A1) of the projection lens unit 5 in the direction along the optical axis A2. Thus, the conversion of the motion may be efficiently performed, and an increase in the size of the fog lamp 1 in the direction along the optical axis A2 may be suppressed. Further, depending on the configuration of the cam mechanism, the degree of freedom in selecting a direction where the rotation axis A3 of the screw member 8 extends, increases. Therefore, the degree of freedom in design for reducing the dimension of the fog lamp 1 in the direction where the optical axis A2 of the projection lens 51, increases.

As illustrated in FIG. 3, the controller 74 is disposed at a side opposite to the left shaft portion 54 and the left shaft holding portion 62 across the screw member 8 and the conversion mechanism 9, to control the operation of the light source 72. That is, the screw member 8 and the conversion mechanism 9 are disposed between the left shaft portion 54 and the left shaft holding portion 62, and the controller 74 in the direction intersecting with the optical axis A2 of the projection lens 51.

According to the above configuration, it is possible to utilize a space in the direction intersecting with the optical axis A2 with a relatively high degree of freedom in layout, while suppressing the dimension in the direction where the optical axis A2 of the projection lens 51 extends.

As illustrated in FIG. 1, the cover housing 3 includes the light transmitting cover 31 that allows the light, which has passed through the projection lens 51, to pass therethrough. The cover housing 3 further includes a connector 32 that supplies a power to the controller 74. The connector 32 protrudes in a direction where the light is emitted through the light transmitting cover 31, in front of the cover housing 3.

As illustrated in FIG. 3, the lens holder 74 includes a pair of reflectors 74*a*. As the cover housing 3 is mounted on the heat sink 2, the power supply terminal 74*a* is disposed in the connector 32. When the connector 32 is connected with a mating connector connected to an external power source (not illustrated), the power supplied from the external power source is provided to a light source driving circuit of the controller 74 via the power supply terminal 74*a*.

In order to secure a passage of the light emitted from the light transmitting cover 31, a space with a certain area is required at the front surface side of the cover housing 3. According to the above configuration, the connector 32 is disposed in the space to supply a power to the controller 74. Therefore, the utilization efficiency of the peripheral space of the fog lamp 1 may be enhanced.

As illustrated in FIG. 1, the cover housing 3 includes a protrusion 33 that protrudes outward. The protrusion 33 is formed at the left side of the light transmitting cover 31, which is also the right side of the connector 32. The protrusion 33 protrudes forward from the front surface of the cover housing 3. The screw member 8 is held in the cover housing 3 such that the rotation axis A3 passes through the protrusion 33.

In order to secure a passage of the light emitted from the light transmitting cover 31, a space with a certain area is required at the front surface side of the cover housing 3. According to the above configuration, the screw member 8 is disposed in the space to adjust the reference position of the optical axis A2 of the projection lens 51. Therefore, the utilization efficiency of the peripheral space of the fog lamp 1 may be enhanced.

As illustrated in FIG. 1, the projection lens 3 includes a ventilation unit 34. The ventilation unit 34 is provided above the protrusion 33. The ventilation unit 34 protrudes forward from the front surface of the cover housing 3. The ventilation unit 34 penetrates the cover housing 3 and communicates with the lamp chamber 4. The ventilation unit 34 is mounted with a filter and a cap (not illustrated).

In order to secure a passage of the light emitted from the light transmitting cover 31, a space with a certain area is required at the front surface side of the cover housing 3. According to the above configuration, the ventilation unit 34 is disposed in the space to communicate with the lamp chamber 4. Therefore, the utilization efficiency of the peripheral space of the fog lamp 1 may be enhanced.

The above-described exemplary embodiment is merely illustrative for facilitating the understanding of the present disclosure. The configuration according to the above-described exemplary embodiment may be appropriately changed or modified without departing from the spirit of the present disclosure. Further, it is obvious that equivalents are included in the scope of the present disclosure.

In the above-described exemplary embodiment, the right shaft portion 53 and the left shaft portion 54 are provided in the lens holder 52. However, the right shaft portion 53 and the left shaft portion 54 may be provided in the projection lens 51.

In the above-described exemplary embodiment, the projection lens 51 and the lens holder 52 are separate members. However, the projection lens 51 and the lens holder 52 may be integrally molded using a light transmitting material.

In the above-described exemplary embodiment, the right shaft portion 53 and the left shaft portion 54 are provided in the projection lens unit 5, and the right shaft holding portion 61 and the left shaft holding portion 62 are provided in the support member 6. On the contrary to this configuration, the support member 6 may be provided with a right shaft portion and a left shaft portion, and the projection lens unit 5 may be provided with a right shaft holding portion and a left shaft holding unit.

In the above-described exemplary embodiment, the lens holder 52 includes a pair of reflectors 52a. However, the number, the shape, and the arrangement of the reflectors 52a may be appropriately determined depending on the specification of the fog lamp 1. Further, the support member 6 may be provided with reflectors.

In the above-described exemplary embodiment, the light emitting surface of the light source 72 is arranged to face the projection lens 51. According to this configuration, the distance between the light source 72 and the projection lens 51 may be shortened, which in turn contributes to thinning of the fog lamp 1. From the viewpoint of the degree of freedom in layout, however, the direction of the light emitting surface of the light source 72 may be appropriately determined depending on the specification.

In the above-described exemplary embodiment, the rotation axis A3 of the screw member 8 extends in the vertical direction. However, the direction of the rotation axis A3 may be appropriately determined depending on the specification of the fog lamp 1 as long as it extends in a direction different from the optical axis A2 of the project lens 51.

In the above-described exemplary embodiment, the cam surface 91d is provided in the transmission member 91, and the cam follower 92 is provided in the projection lens unit 5. Contrary to this configuration, the projection lens unit 5 may be provided with a cam surface, and the transmission member 91 may be provided with a cam follower.

In the above-described exemplary embodiment, the projection lens unit 5 and the support member 6 are disposed at the right side of the screw member 8 and the conversion mechanism 9. Contrary to this configuration, the projection lens unit 5 and the support member 6 may be disposed at the left side of the screw member 8 and the conversion mechanism 9. In this case, the screw member 8 and the conversion mechanism 9 are disposed at positions farther away from the optical axis A2 than the right shaft portion 53 and the right shaft holding portion 61, in the direction intersecting with the optical axis A2 of the projection lens 51.

The position relationship among the connector 32, the protrusion 33, and the ventilation unit 34 may be appropriately determined depending on the specification of the fog lamp 1 as long as they are provided at the same side as the light transmitting cover 31.

In the exemplary embodiment, the fog lamp 1 has been described as an example of the illumination device. However, the present disclosure may be applied to various illumination devices in which a projection lens is provided in a lamp chamber defined by a housing and a light transmitting cover, and an optical axis adjustment of the projection lens is required.

From the foregoing, it will be appreciated that various exemplary embodiments of the present disclosure have been described herein for purposes of illustration, and that various modifications may be made without departing from the scope and spirit of the present disclosure. Accordingly, the various exemplary embodiments disclosed herein are not intended to be limiting, with the true scope and spirit being indicated by the following claims.

What is claimed is:

1. An illumination device mounted in a vehicle, the illumination device comprising:
 a light source;
 a projection lens unit having a projection lens configured to allow at least some of light emitted from the light source to pass therethrough to illuminate light toward a front side of the projection lens;
 a support member having a planar surface, the planar surface being configured to support the projection lens;
 a shaft portion provided in one of the projection lens unit and the support member, and including a pivot axis that extends in a direction intersecting with an optical axis of the projection lens;
 a shaft holding portion provided in the other of the projection lens unit and the support member, and configured to hold the shaft portion to be pivotable around the pivot axis of the projection lens;
 a screw member provided to be rotatable around a rotation axis that extends in a direction different from the optical axis; and
 a conversion mechanism configured to convert a rotating motion of the screw member around the rotation axis into a pivoting motion of the shaft portion around the pivot axis,
 wherein the rotation axis is parallel to the planar surface and the pivot axis is also parallel to the planar surface,
 wherein the projection lens pivots about the pivot axis in a first range of degrees, and
 wherein the optical axis is perpendicular to the rotation axis when the projection lens illuminates the light toward the front side of the vehicle.

2. The illumination device of claim 1, wherein the conversion mechanism includes:
 a transmission member screwed with the screw member to convert the rotating motion of the screw member around the rotation axis to a linear motion;
 a cam surface provided in one of the transmission member and the projection lens unit; and
 a cam follower provided in the other of the transmission member and the projection lens unit, and configured to convert the linear motion to the pivoting motion of the shaft portion around the pivot axis by sliding on the cam surface.

3. The illumination device of claim 2, further comprising:
 a controller configured to control an operation of the light source,
 wherein the conversion mechanism is disposed between the shaft portion and the controller in the direction intersecting with the optical axis.

4. The illumination device of claim 3, further comprising:
 a housing defining a part of a lamp chamber that accommodates the light source, the support member, the shaft portion, the shaft holding portion, the conversion mechanism, and a part of the screw member, and including a light transmitting unit configured to allow the light, which has passed through the projection lens, to pass therethrough; and
 a connector disposed at a side where the light transmitting unit is provided in the housing, and configured to supply a power to the controller.

5. The illumination device of claim 2, wherein the transmission member is configured to move vertically along the rotation axis as the screw member rotates, and wherein light emitted from the projection lens moves upward as the transmission member moves upward along the rotation axis.

6. The illumination device of claim 1, further comprising:
a controller configured to control an operation of the light source,
wherein the conversion mechanism is disposed between the shaft portion and the controller in the direction intersecting with the optical axis.

7. The illumination device of claim 6, further comprising:
a housing defining a part of a lamp chamber that accommodates the light source, the support member, the shaft portion, the shaft holding portion, the conversion mechanism, and a part of the screw member, and including a light transmitting unit configured to allow the light, which has passed through the projection lens, to pass therethrough; and
a connector disposed at a side where the light transmitting unit is provided in the housing, and configured to supply a power to the controller.

8. The illumination device of claim 6, further comprising:
a housing defining a part of a lamp chamber that accommodates the light source, the support member, the shaft portion, the shaft holding portion, the conversion mechanism, and a part of the screw member, and including a light transmitting unit configured to allow the light, which has passed through the projection lens, to pass therethrough; and
a ventilation unit disposed at a side where the light transmitting unit is provided in the housing, and provided in communication with the lamp chamber.

9. The illumination device of claim 1, further comprising:
a housing defining a part of a lamp chamber that accommodates the light source, the support member, the shaft portion, the shaft holding portion, the conversion mechanism, and a part of the screw member, and including a light transmitting unit configured to allow the light, which has passed through the projection lens, to pass therethrough,
wherein the housing further includes a protrusion that protrudes outward at a side where the light transmitting unit is provided in the housing, and the screw member is held in the housing such that the rotation axis passes through the protrusion.

10. The illumination device of claim 1, wherein the screw member and the conversion mechanism are positioned farther away from the optical axis than the shaft portion and the shaft holding portion in the direction intersecting with the optical axis.

11. The illumination device of claim 1, wherein the optical axis is not parallel to the rotation axis during pivotal of the projection lens throughout the first range of degrees.

* * * * *